United States Patent
Huang et al.

(10) Patent No.: US 10,018,470 B2
(45) Date of Patent: Jul. 10, 2018

(54) LOCATION-BASED OPERATING MODES

(71) Applicant: Apple Inc., Cupertino, CA (US)

(72) Inventors: Ronald K. Huang, San Jose, CA (US); Robert Mayor, Half Moon Bay, CA (US); Maximilian H. Luttrell, San Francisco, CA (US); Brendan J. Langoulant, San Francisco, CA (US); Vera Carr, San Francisco, CA (US); Stephen J. Rhee, San Jose, CA (US); Gregory Novick, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 317 days.

(21) Appl. No.: 14/502,076

(22) Filed: Sep. 30, 2014

(65) Prior Publication Data

US 2015/0176998 A1    Jun. 25, 2015

Related U.S. Application Data

(60) Provisional application No. 61/919,686, filed on Dec. 20, 2013.

(51) Int. Cl.
| | |
|---|---|
| *G01C 21/00* | (2006.01) |
| *H04W 4/00* | (2018.01) |
| *G01C 21/20* | (2006.01) |
| *H04W 4/02* | (2018.01) |
| *H04W 4/021* | (2018.01) |
| *G01C 21/36* | (2006.01) |

(52) U.S. Cl.
CPC ......... *G01C 21/20* (2013.01); *G01C 21/3679* (2013.01); *H04W 4/02* (2013.01); *H04W 4/021* (2013.01)

(58) Field of Classification Search
None
See application file for complete search history.

(56) References Cited

U.S. PATENT DOCUMENTS

| | | | | |
|---|---|---|---|---|
| 8,229,471 | B1* | 7/2012 | Kirkham | H04W 4/021 455/456.1 |
| 8,385,944 | B1* | 2/2013 | Nelissen | H04W 4/021 455/412.2 |
| 8,750,895 | B2 | 6/2014 | Grosman et al. | |
| 2004/0203768 | A1* | 10/2004 | Ylitalo | H04M 1/72572 455/435.1 |
| 2004/0236504 | A1* | 11/2004 | Bickford | G01C 21/3679 701/408 |
| 2010/0004004 | A1* | 1/2010 | Browne-Swinburne | H04W 4/02 455/457 |
| 2010/0250592 | A1 | 9/2010 | Paquet et al. | |
| 2012/0309413 | A1* | 12/2012 | Grosman | H04W 64/006 455/456.1 |
| 2014/0171099 | A1* | 6/2014 | Sydir | H04W 4/043 455/456.1 |
| 2015/0087264 | A1* | 3/2015 | Goyal | G01S 19/34 455/411 |

(Continued)

*Primary Examiner* — Kevin P Mahne
(74) *Attorney, Agent, or Firm* — Fish & Richardson P.C.

(57) ABSTRACT

A location-aware device detects if a personal or point of interest region has been entered or exited and a current context of the device. In response, an operating mode is selected based on the region and a current context of the device. The operating mode is configurable by a user, including setting geofence parameters, context parameters and operating mode parameters.

20 Claims, 6 Drawing Sheets

(56) References Cited

U.S. PATENT DOCUMENTS

2015/0140994 A1* 5/2015 Partheesh ............. H04W 4/021
            455/420
2015/0365799 A1* 12/2015 Sheha .................... G01C 21/20
            455/456.3

* cited by examiner

LOCATION-BASED OPERATING MODES

CROSS-REFERENCE TO RELATED APPLICATION

This application claims priority to U.S. Provisional Patent Application No. 61/919,686, entitled "Location Based Operating Modes," filed on Dec. 20, 2013, the entire contents of which are incorporated herein by reference.

TECHNICAL FIELD

This disclosure relates generally to location-based services for mobile devices.

BACKGROUND

Location-based services (LBS) provide location-aware devices access to information and services through a wireless network based on the geographical position of the mobile device. LBS include services to identify a location of a person or object, such as discovering the nearest museum or the whereabouts of a friend. LBS may include mobile commerce in the form of coupons or advertising targeted to customers based on their current locations.

A geofence is a virtual perimeter for real-world geographic area. A geofence may be dynamically generated by specifying a radius around a store or point location. When a location-aware device enters or exits a geofence, the device may receive a notification from LBS through a text message, e-mail or telephone call.

SUMMARY

A location-aware device detects if a personal or point of interest (POI) region has been entered or exited and a current context of the device. In response, an operating mode is selected based on the region and a current context of the device. The operating mode is configurable by a user, including setting geofence parameters, context parameters and operating mode parameters (e.g., device settings and notifications).

In some implementations, the location of the device need not be determined for detecting if the device has entered or exited a region. In such cases, a scan list of wireless transmitters is processed to detect the occurrence of a geofence crossing. If the crossing of a geofence is detected by the device, geographic coordinates may be provided by a positioning system and geocoded to identify the POI. Third party LBS associated with the POI region may be notified that the device desires to receive notifications based on the operating mode of the device.

Particular implementations disclosed herein provide one or more of the following advantages. Users may configure operating modes on their location-aware devices for personal regions and POI regions, so that device settings and notifications may be automatically adjusted to the user's interests and lifestyle if the user enters or exits a personal or POI region.

The details of the disclosed implementations are set forth in the accompanying drawings and the description below. Other features, objects, and advantages will be apparent from the description and drawings, and from the claims.

DESCRIPTION OF DRAWINGS

The same reference symbol used in various drawings indicates like elements.

DETAILED DESCRIPTION

Example System

Figure 1:
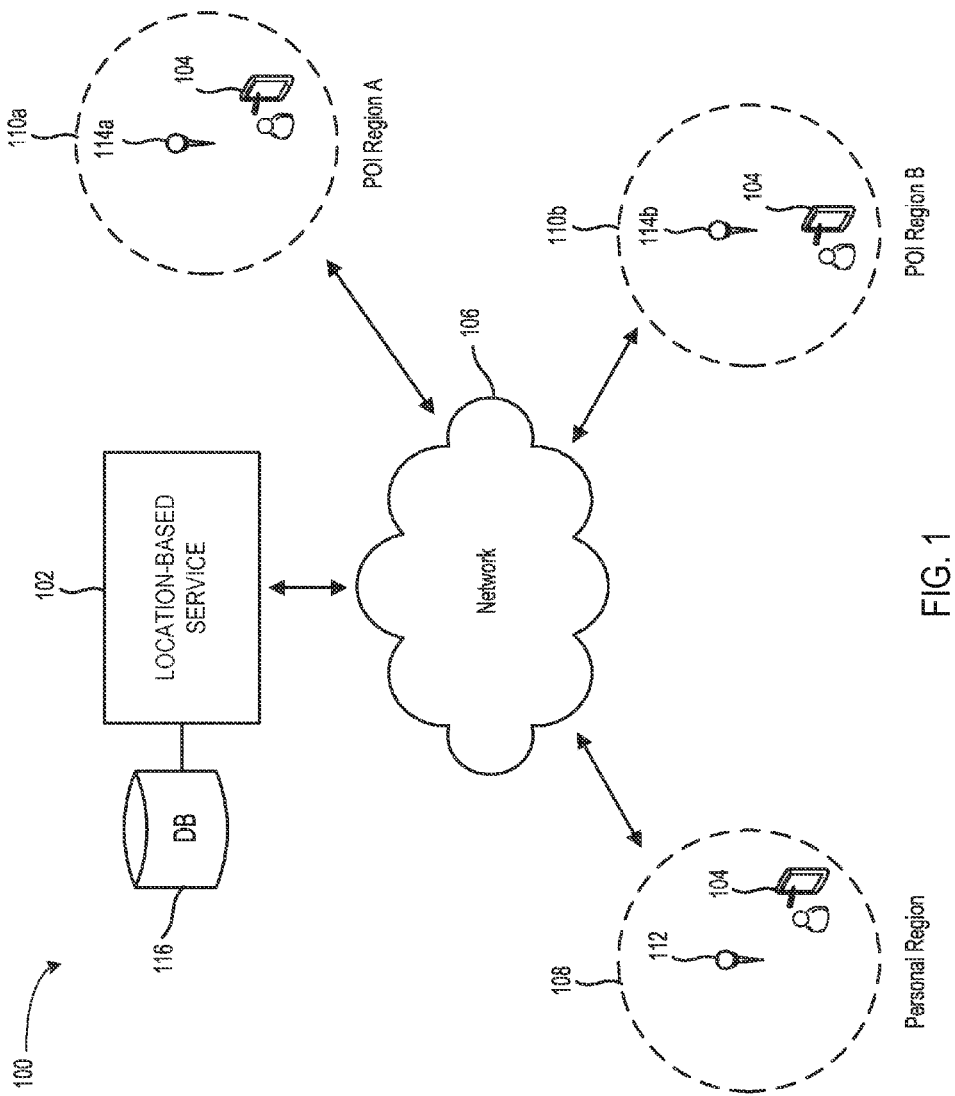
FIG. 1 is a block diagram of an example system implementing location-based operating modes.

FIG. 1 is a block diagram of an example system 100 implementing location-based operating modes. In some implementations, system 100 may include LBS 102, location-aware device 104, network 106, personal region 108 and POI regions 110*a*, 110*b*. LBS 102 and device 104 communicate using network 106. Personal region 108 is defined by a geofence surrounding personal location 112. POI regions 110*a*, 110*b* are defined by geofences surrounding POI locations 114*a*, 114*b*.

LBS 102 may include one or more server computers and other equipment and software for communicating with device 104. LBS data may be stored in database 116, which is accessible to LBS 102 and may be made accessible to device 104 through LBS 102.

Devices 104 may be any device capable of processing data. Device 104 may communicate with LBS 102 through various wireless connections (e.g., WiFi, cellular) to network 106. Device 104 may include a variety of sensors that provide data that may be used to determine the context of device 104. The context of device 104 includes internal (internal to device 104) or external events that form an environment within which device 104 operates. Some examples of device 104 include, but are not limited to personal computers, smart phones and electronic tablets.

Network 106 may be a collection of one or more networks that include hardware (e.g., router, hubs) and software configured for transporting information from one device to another device. Some examples of network 106 are Local Area Networks (LAN), Wide Area Networks (WAN), Wireless LAN (WLAN), Internet, intranets, cellular networks and the Public Switched Telephone Network (PSTN).

In the example shown, a user has set up three operating modes for device 104. A first operating mode is configured for personal region 108. Personal region 108 is a geographic region that is personal to the user, including but not limited to Home Region and Work Region. Personal region 108 may be defined by a geofence using a radial distance parameter (e.g., a distance in miles or meters) from personal location 112. An example of personal location 112 is the user's home or work address, which may be discovered from, for example, the user's contacts or address book stored on device 104 or stored by LBS 102 in database 116.

POI regions 110*a*, 110*b* are regions that include the address of POI locations 114*a*, 114*b*. POI regions 110*a*, 110*b* may be defined by geofences using a radial distance parameter (e.g., a distance in miles or meters) from POI locations 114*a*, 114*b*. Some examples of POI locations 114*a*, 114*b* include but are not limited to retail stores, shopping malls, movie theatres, restaurants, amusement parks, national parks, landmarks, museums and any other public or private institutions or landmarks or any other specific point location that someone may find useful or interesting. Addresses of POI locations 114a, 114b can be discovered from map databases, such as the U.S. Geological Survey (USGS) National Geologic Map Database.

System 100 is one example of a system for implementing location-based operating modes. Other implementations are possible, including systems that include more than one LBS 102, device 104, network 106, database 116, regions 108, 110 and point locations 112, 114.

If user enters or exits personal region 108 or POI regions 110a, 110b and a certain current context for device 104 exists, an operating mode for region 108 is automatically initiated on device 104. The operating mode may be configured using the user interfaces described in reference to FIGS. 2A-2C. An operating mode may cause changes to settings of device 104 and define how notifications will be managed by device 104. Some examples of device settings may include but are not limited to activating or deactivating "do not disturb" modes, sound volume silencing (e.g., telephone ringer volume, keyboard clicks, text message (e.g., SMS) tones, notification management, mail and text message lock screen previews, automatic lock display timeout, passcode requirements to access device, etc.

For one example, a user can configure an operating mode on a smart phone for personal region 108 that includes deactivating Do Not Disturb mode when the user enters Home Region. In Do Not Disturb mode, the user's phone can still receive incoming calls, messages and other notifications, but will not alert the user until later, keeping the smart phone's screen dark, its vibrations still and its tones silent.

For another example, a user can configure a first operating mode on their electronic tablet for Home Region and second operating mode on their electronic tablet for Work Region. The first and second operating modes can have different device settings and notification management. For example, certain applications or websites can be restricted when in the first (Home Region) operating mode to prevent other users (e.g., children) from accessing those applications or websites.

For another example, a user can configure an operating mode on their smart phone for POI region 110a (e.g., a library, museum or movie theatre) that includes silencing ringer volume, keyboard clicks, SMS tones and any other audio generated by device 104.

Example User Interfaces

Figure 2A:
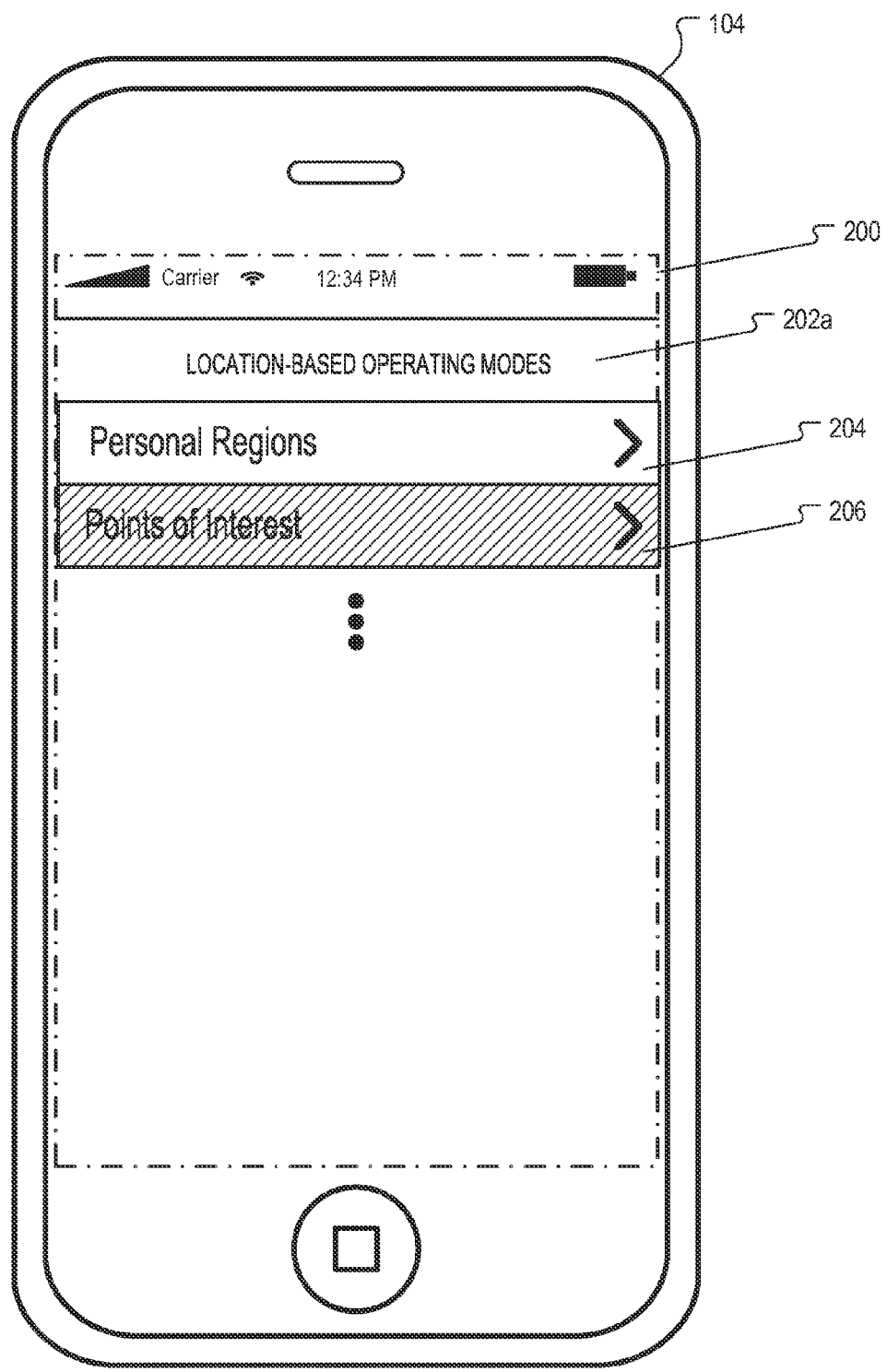
FIG. 2A illustrates an example user interface for selecting between a personal region and a POI region.

FIG. 2A illustrates an example user interface for allowing a user to select between a personal region option and a POI region option. In some implementations, device 104 may include a touch sensitive surface 200 that presents user interface 202a including user interface elements 204, 206 for accessing personal regions and POI region settings, respectively.

Figure 2B:
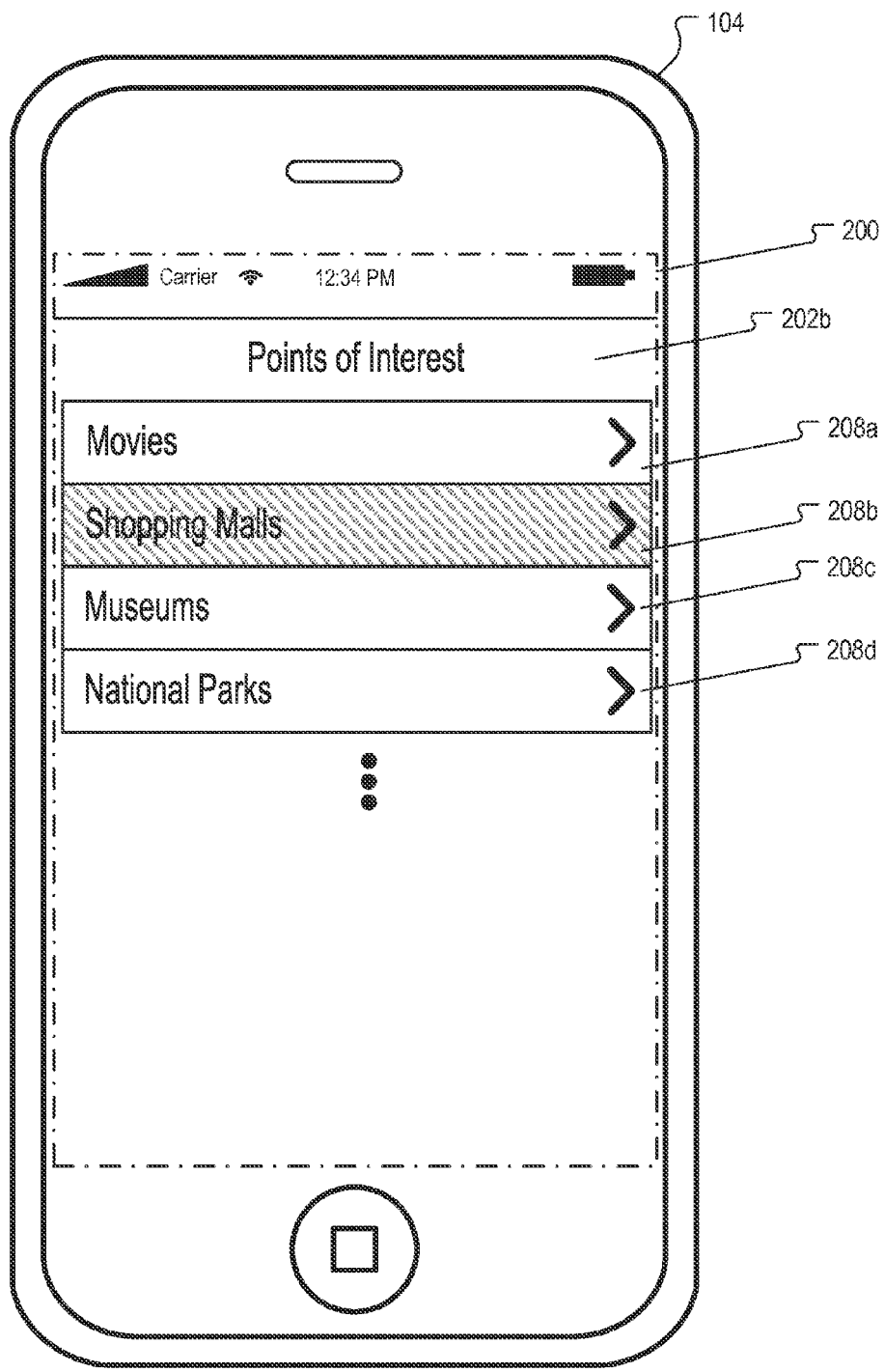
FIG. 2B illustrates an example user interface for selecting a POI region.

FIG. 2B illustrates an example user interface 202b that is presented when the user selects element 206 (points of interest option) for exposing settings for a POI region. In this example, user interface 202b may include user interface elements 208a-208d for selecting POI categories of Movies, Shopping Malls, Museums and National Parks. Other categories are possible. In the example shown, the user selected Shopping Malls element 208b to configure an operating mode for Shopping Malls.

Figure 2C:
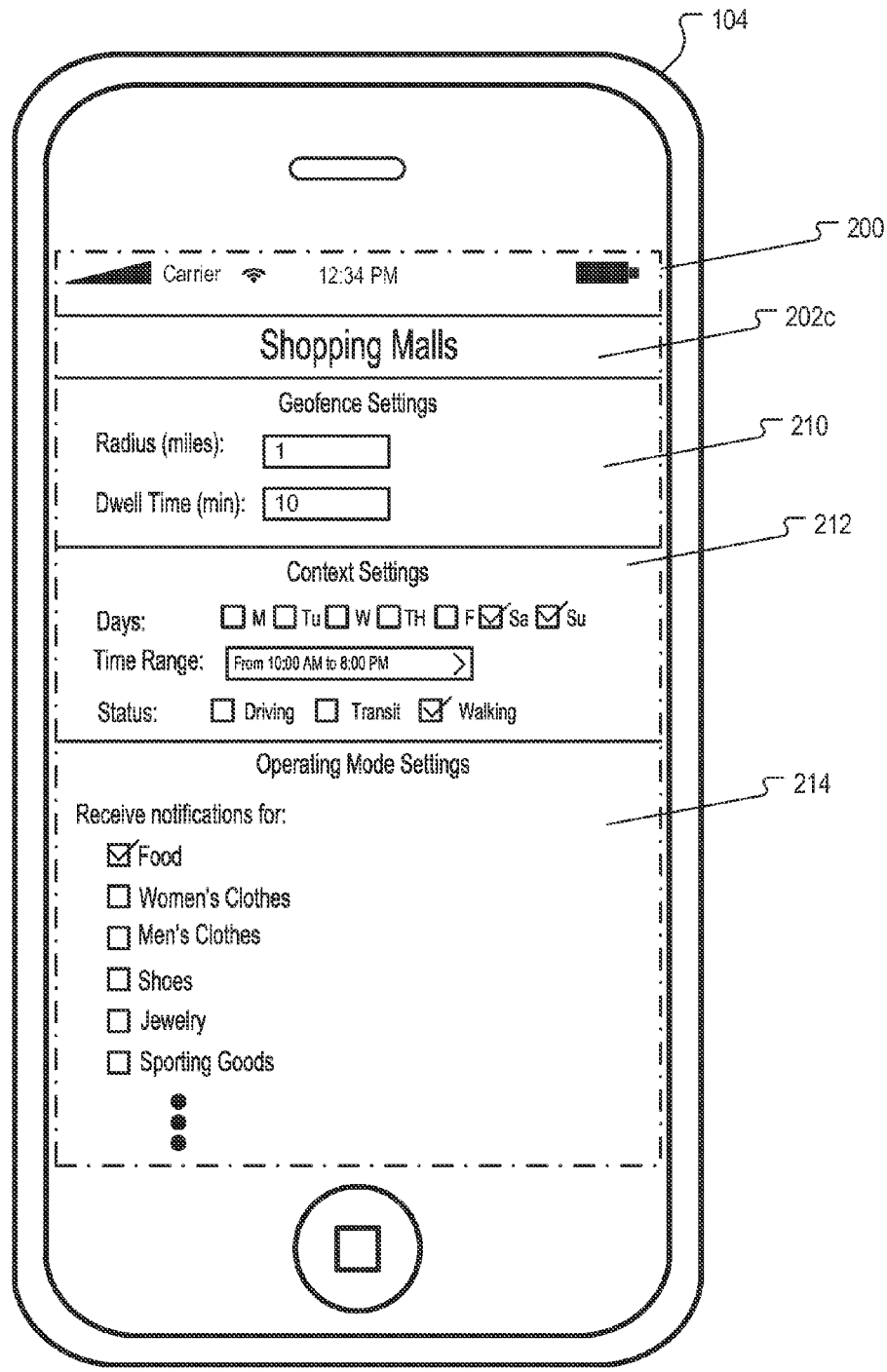
FIG. 2C illustrates an example user interface for setting geofence, context and operating mode parameters.

FIG. 2C illustrates an example user interface 202c that is presented when the user selects element 208b (Shopping Mall option) for exposing settings for a Shopping Mall category. In this example, user interface 202c may include geofence settings 210, context settings 212 and operating mode settings 214.

Geofence settings 210 allow a user to set a radius parameter and dwell time parameter. The radius parameter defines the size of the geofence around the shopping mall address and the dwell time determines the amount of time device 104 can remain within the geofence before the shopping mall operating mode is activated. The radius value should be large enough to cover the entire shopping mall complex, which may span several square miles. If the user enters the geofence but only stays within the geofence for less than the specified dwell time there is an assumption that the user was only passing by the shopping mall and did not intend to stop and shop. Thus, the dwell time parameter is a confidence check that prevents device 104 from activating the shopping mall operating mode inadvertently.

Context settings 212 allow a user to set various context parameters. For the example shown, the user set Friday, Saturday and Sunday as the days of the week and a time range of 10:00 AM to 8:00 PM. Context settings 212 also allow the user to specify a travel mode. The travel mode indicates how the user must be traveling for the shopping mall operating mode to be activated. Travel mode may include but not be limited to driving, public transportation or walking In the example shown the user has selected the travel mode: Walking Operating mode settings 214 allow a user to set various device and/or notification management settings that will become active when the Shopping Mall operating mode is activated. In the example shown, the user has checked a check box corresponding to notifications related to a Food category. Other categories include Women's clothes, Men's clothes, Shoes, Jewelry and Sporting goods and any other desired categories. The notifications can include advertisements, coupons and any other information related to the category. Notifications can include embedded or attached content including text, photos, video and audio. Notifications can include phone numbers and links to websites, social networks or other network resources. Notifications can be delivered as Web pages, text messages, multimedia messages, telephone calls and streaming audio or video. In some implementations, device 104 vibrates to indicate a notification.

Based on the example settings shown in FIG. 2C, the user desires to receive notification related to food each time the user is walking within 1 mile of a shopping mall for at least 10 minutes on Friday, Saturday or Sunday between the hours of 10:00 AM to 8:00 PM. By combining geofence settings, context settings and operating mode settings, the user can more precisely manage their device and the kinds and amount of information that is displayed to the user by device 104.

Example Settings Process

Figure 3:
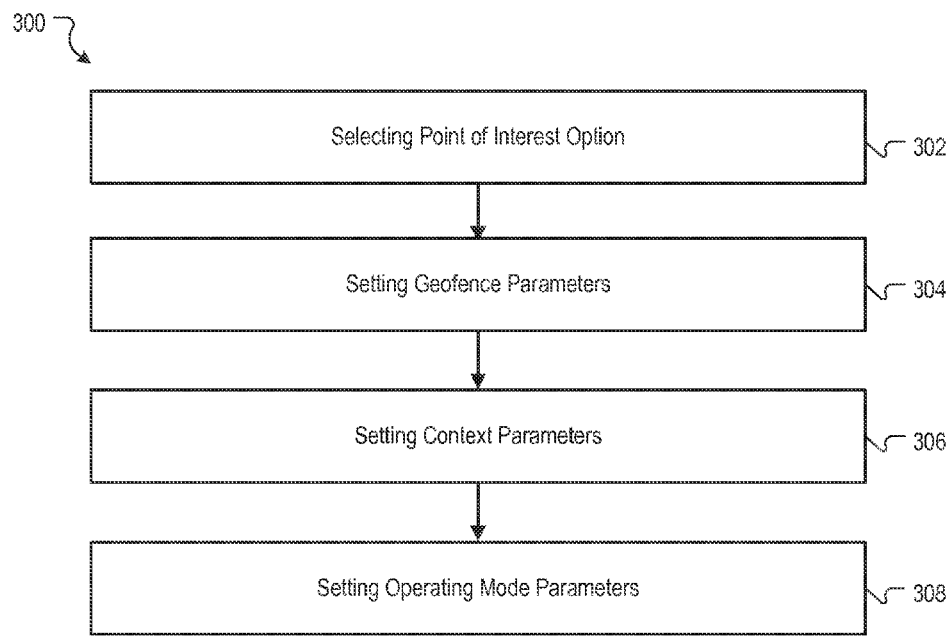
FIG. 3 is a flow diagram of an example process for setting location-based operating modes.

FIG. 3 is a flow diagram of an example process 300 for setting location-based operating modes. Process 300 can be implemented using device architecture 500 described in reference to FIG. 5.

In some implementations, process 300 may begin by receiving a first input selecting a POI option (302). The POI option may be included on a user interface presented on a touch sensitive surface of a location-aware device. The POI option may be a user interface element, such as a virtual button, check box, radial button and the like.

Process 300 may continue by receiving a second input setting geofence parameters (304). Geofence parameters may include a radius parameter and a dwell time parameter, as described in reference to FIG. 2C.

Process 300 may continue by receiving a third input setting context parameters (306). Context parameters may include date and time parameters and travel mode, such as driving, public transportation and walking, as described in reference to FIG. 2C.

Process 300 may continue by receiving a fourth input setting operating mode parameters (308). Operating mode parameters can include device settings and notification settings, a described in reference to FIG. 2C.

In some implementations, a user may use voice commands and an intelligent virtual assistant (e.g., a speech recognition engine) to specify the settings in reference to FIGS. 2A-2C.

Example Operating Mode Activation Process

Figure 4:
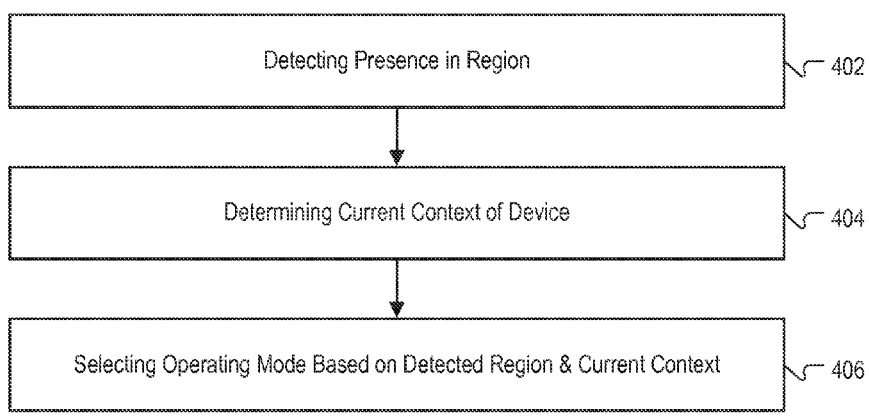
FIG. 4 is a flow diagram of an example process for activating a location-based operating mode.

FIG. 4 is a flow diagram of an example process 400 for activating a location-based operating mode. Process 400 can be implemented using device architecture 500 described in reference to FIG. 5.

Process 400 may begin by detecting the presence of a device in a region (402). In some implementations, the device receives data defining a geofence from LBS 102. The device may select from multiple wireless access points, one or more wireless access points for monitoring the geofence. The selected wireless access points may be monitored by a wireless processor of the device. The wireless processor can detect a potential entry of the geofence when at least one of the selected one or more wireless access points is detected. Upon a detection of the potential entry of the geofence by the wireless processor, the device can use an application processor of the device to determine whether the device entered the geofence. The foregoing process is described in further detail in co-pending U.S. patent application Ser. No. 13/153,377, for "Monitoring A Geofence Using Wireless Access Points," filed Jun. 3, 2011, which patent application is incorporated by reference herein in its entirety.

Process 400 may continue by determining a current context of the device (404). The current context of the device may be determined by sensors, clock or timer of the device. For example, a system clock can be used to determine when a particular date and time has occurred. Accelerometers, gyro sensors and a magnetometer can be used determine whether the device is moving and its orientation with respect to a reference coordinate frame. Thus, these onboard motion sensors can be used to determine the traveling status of the user, as described in reference to FIG. 2C. For example, accelerometer data can be analyzed (e.g., integrated to obtain velocity) to determine if the user is driving in a car or walking, and the user's direction of travel.

Process 400 may continue by selecting an operating mode based on the detected region and the current context of the device (406). If the current context parameters are satisfied while the device is within the detected region, the operating mode for the region will be activated.

Example Device Architecture

Figure 5:
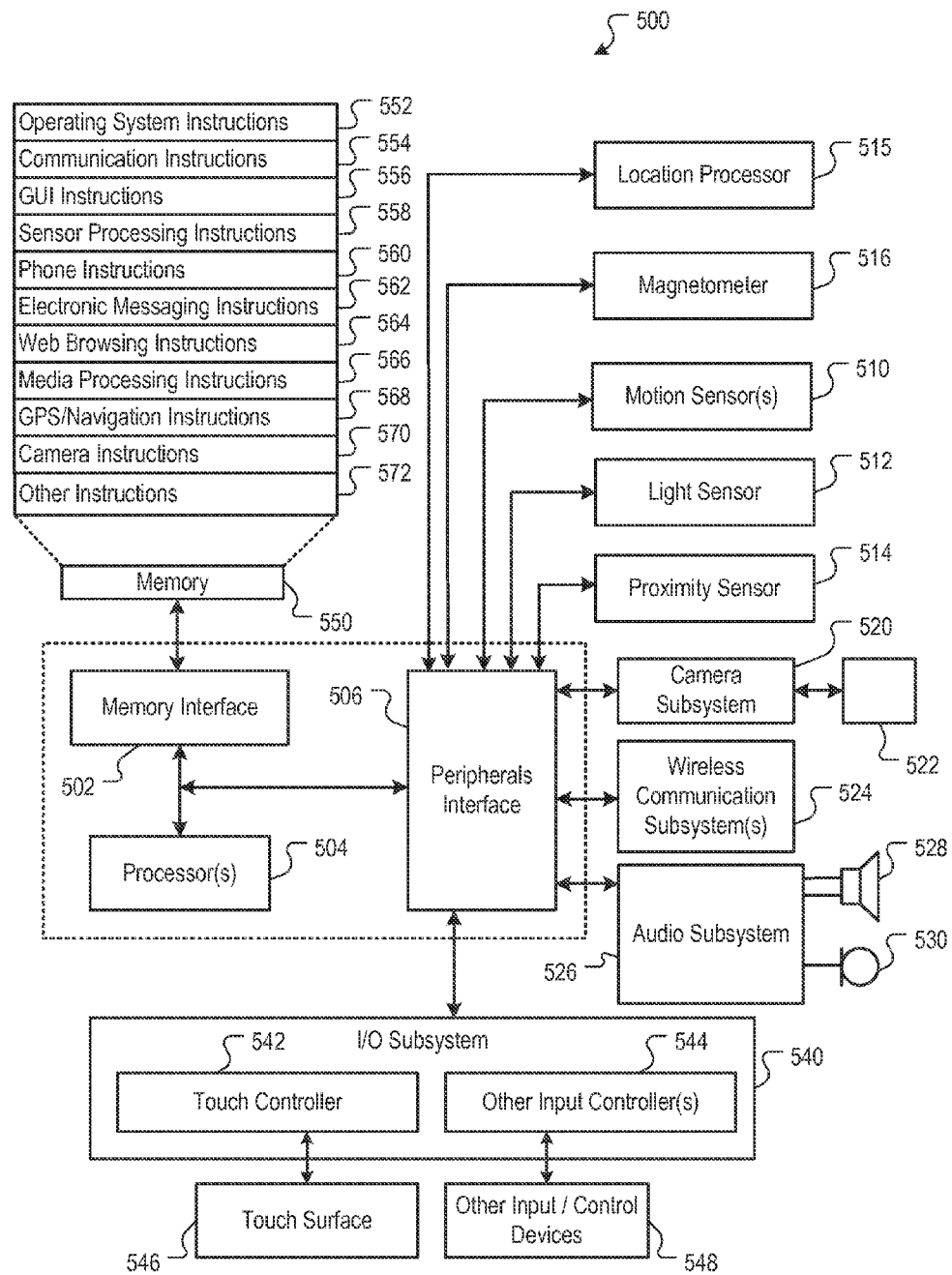
FIG. 5 is a block diagram of an exemplary architecture of a location-aware device capable of implementing the features and processes described in reference to FIGS. 1-4.

FIG. 5 is a block diagram of an exemplary architecture of a location-aware device capable of implementing the features and processes described in reference to FIGS. 1-4.

Architecture 500 may be implemented in any device for generating the features described in reference to FIGS. 1-4, including but not limited to portable or desktop computers, smart phones and electronic tablets, television systems, game consoles, kiosks and the like. Architecture 500 may include memory interface 502, data processor(s), image processor(s) or central processing unit(s) 504, and peripherals interface 506. Memory interface 502, processor(s) 504 or peripherals interface 506 may be separate components or may be integrated in one or more integrated circuits. The various components may be coupled by one or more communication buses or signal lines.

Sensors, devices, and subsystems may be coupled to peripherals interface 506 to facilitate multiple functionalities. For example, motion sensor 510, light sensor 512, and proximity sensor 514 may be coupled to peripherals interface 506 to facilitate orientation, lighting, and proximity functions of the device. For example, in some implementations, light sensor 512 may be utilized to facilitate adjusting the brightness of touch surface 546. In some implementations, motion sensor 510 (e.g., an accelerometer, gyros) may be utilized to detect movement and orientation of the device. Accordingly, display objects or media may be presented according to a detected orientation (e.g., portrait or landscape).

Other sensors may also be connected to peripherals interface 506, such as a temperature sensor, a biometric sensor, or other sensing device, to facilitate related functionalities.

Location processor 515 (e.g., GPS receiver) may be connected to peripherals interface 506 to provide geopositioning. Electronic magnetometer 516 (e.g., an integrated circuit chip) may also be connected to peripherals interface 506 to provide data that may be used to determine the direction of magnetic North. Thus, electronic magnetometer 516 may be used as an electronic compass.

Camera subsystem 520 and an optical sensor 522, e.g., a charged coupled device (CCD) or a complementary metal-oxide semiconductor (CMOS) optical sensor, may be utilized to facilitate camera functions, such as recording photographs and video clips.

Communication functions may be facilitated through one or more communication subsystems 524. Communication subsystem(s) 524 may include one or more wireless communication subsystems. Wireless communication subsystems 524 may include radio frequency receivers and transmitters and/or optical (e g , infrared) receivers and transmitters. Wired communication system may include a port device, e.g., a Universal Serial Bus (USB) port or some other wired port connection that may be used to establish a wired connection to other computing devices, such as other communication devices, network access devices, a personal computer, a printer, a display screen, or other processing devices capable of receiving or transmitting data. The specific design and implementation of the communication subsystem 524 may depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, 802.x communication networks (e.g., Wi-Fi, Wi-Max), code division multiple access (CDMA) networks, and a Bluetooth™ network. Communication subsystems 524 may include hosting protocols such that the device may be configured as a base station for other wireless devices. As another example, the communication subsystems may allow the device to synchronize with a host device using one or more protocols, such as, for example, the TCP/IP protocol, HTTP protocol, UDP protocol, and any other known protocol.

Audio subsystem 526 may be coupled to a speaker 528 and one or more microphones 530 to facilitate voice-enabled functions, such as voice recognition, voice replication, digital recording, and telephony functions.

I/O subsystem 540 may include touch controller 542 and/or other input controller(s) 544. Touch controller 542 may be coupled to a touch surface 546. Touch surface 546 and touch controller 542 may, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch surface 546. In one implementation, touch surface 546 may display virtual or soft buttons and a virtual keyboard, which may be used as an input/output device by the user.

Other input controller(s) 544 may be coupled to other input/control devices 548, such as one or more buttons, rocker switches, thumb-wheel, infrared port, USB port, and/or a pointer device such as a stylus. The one or more buttons (not shown) may include an up/down button for volume control of speaker 528 and/or microphone 530.

In some implementations, device 500 may present recorded audio and/or video files, such as MP3, AAC, and MPEG files. In some implementations, device 500 may include the functionality of an MP3player and may include a pin connector for tethering to other devices. Other input/output and control devices may be used.

Memory interface 502 may be coupled to memory 550. Memory 550 may include high-speed random access memory or non-volatile memory, such as one or more magnetic disk storage devices, one or more optical storage devices, or flash memory (e.g., NAND, NOR). Memory 550 may store operating system 552, such as Darwin, RTXC, LINUX, UNIX, OS X, WINDOWS, or an embedded operating system such as VxWorks. Operating system 552 may include instructions for handling basic system services and for performing hardware dependent tasks. In some implementations, operating system 552 may include a kernel (e.g., UNIX kernel).

Memory 550 may also store communication instructions 554 to facilitate communicating with one or more additional devices, one or more computers or servers. Communication instructions 554 may also be used to select an operational mode or communication medium for use by the device, based on a geographic location (obtained by the GPS/Navigation instructions 568) of the device. Memory 550 may include graphical user interface instructions 556 to facilitate graphic user interface processing; sensor processing instructions 558 to facilitate sensor-related processing and functions; phone instructions 560 to facilitate phone-related processes and functions; electronic messaging instructions 562 to facilitate electronic-messaging related processes and functions; web browsing instructions 564 to facilitate web browsing-related processes and functions; media processing instructions 566 to facilitate media processing-related processes and functions; GPS/Navigation instructions 568 to facilitate GPS and navigation-related processes; camera instructions 570 to facilitate camera-related processes and functions; and other instructions 572 for facilitating other processes, features and applications, such as the features and processes described in reference to FIGS. 1-4.

Each of the above identified instructions and applications may correspond to a set of instructions for performing one or more functions described above. These instructions need not be implemented as separate software programs, procedures, or modules. Memory 550 may include additional instructions or fewer instructions. Furthermore, various functions of the device may be implemented in hardware and/or in software, including in one or more signal processing and/or application specific integrated circuits.

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor; and method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with an author, the features may be implemented on a computer having a display device such as a CRT (cathode ray tube) or LCD (liquid crystal display) monitor for displaying information to the author and a keyboard and a pointing device such as a mouse or a trackball by which the author may provide input to the computer.

The features may be implemented in a computer system that includes a back-end component, such as a data server or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include a LAN, a WAN and the computers and networks forming the Internet.

The computer system may include clients and servers. A client and server are generally remote from each other and typically interact through a network. The relationship of client and server arises by virtue of computer programs running on the respective computers and having a client-server relationship to each other.

One or more features or steps of the disclosed embodiments may be implemented using an Application Programming Interface (API). An API may define on or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

A number of implementations have been described. Nevertheless, it will be understood that various modifications may be made. The systems and techniques presented herein are also applicable to other electronic text such as electronic newspaper, electronic magazine, electronic documents etc. Elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
receiving, by a mobile device, a first input selecting a category from a plurality of category options, the category options defining different types of points of interest;
receiving, by the mobile device, a second input selecting one or more subcategories from a plurality of subcategory options, the subcategory options being different types of products or services associated with the category selected by the first input;
discovering, by the mobile device, a particular point of interest from a map database that falls within the category selected by the first input;
detecting, by the mobile device, that the mobile device has entered or exited a geofence surrounding a geographic region including the particular point of interest;
determining, by one or more motion sensors of the mobile device, a current context of the mobile device, the current context being that a user of the mobile device is walking or driving with the mobile device and a direction of travel of the user;
determining, by the mobile device, whether or not to present a notification on the mobile device based on the current context;
responsive to determining to present the notification on the mobile device, determining, by the mobile device, a user-selected notification type based on the subcategory selected by the second input; and
presenting, on the mobile device, the notification of the user-selected notification type on the mobile device.

2. The method of claim 1, wherein the detecting further comprises:
monitoring wireless access points to determine that the geofence has been entered or exited by the mobile device.

3. The method of claim 1, wherein the geofence size is determined by a user-selected radius parameter.

4. The method of claim 1, wherein the detecting includes determining that a dwell time within the geofence has been exceeded.

5. The method of claim 1, where determining not to present the notification on the mobile device comprises:
determining that an operating mode is enabled on the mobile device that delays presentation of notifications of incoming telephone calls and messages to the mobile device.

6. The method of claim 1, wherein determining the current context further includes determining at least one of a day of the week or current time.

7. The method of claim 1, wherein determining the current context further includes determining that a user-selected context parameter indicates travel status.

8. The method of claim 1, wherein the notification type is associated with a user-selected category of products or services.

9. The method of claim 1,
wherein the geographic region is associated with a home or work address of the user that is stored in contacts or an address book on the mobile device.

10. A mobile device comprising:
one or more motion sensors;
one or more processors;
memory coupled to the one or more processors and configured to store instructions, which, when executed by the one or more processors, causes the one or more processors to perform operations comprising:
receiving a first input selecting a category from a plurality of category options, the category options defining different types of points of interest;
receiving a second input selecting one or more subcategories from a plurality of subcategory options, the subcategory options being different types of products or services associated with the category selected by the first input;

discovering a particular point of interest from a map database that falls within the category selected by the first input;

detecting that the mobile device has entered or exited a geofence surrounding a geographic region including the particular point of interest;

determining, by the one or more sensors, a current context of the mobile device, the current context being that a user of the mobile device is walking or driving with the mobile device and a direction of travel of the user;

determining whether or not to present a notification on the mobile device based on the current context;

responsive to determining to present the notification on the mobile device, determining a user-selected notification type based on the subcategory selected by the second input; and presenting the notification of the user-selected notification type on the mobile device.

11. The mobile device of claim 10, wherein the detecting further comprises:

monitoring wireless access points to determine that the geofence has been entered or exited by the mobile device.

12. The mobile device of claim 10, wherein the geofence size is determined by a user-selected radius parameter.

13. The mobile device of claim 10, wherein the detecting includes determining that a dwell time within the geofence has been exceeded.

14. The mobile device of claim 10, where determining not to present the notification on the mobile device comprises:

determining that an operating mode is enabled on the mobile device that delays presentation of notifications of incoming telephone calls and messages to the mobile device.

15. The mobile device of claim 10, wherein determining the current context further includes determining at least one of a day of the week or current time.

16. The mobile device of claim 10, wherein determining the current context further includes determining that a user-selected context parameter indicates a travel status.

17. The mobile device of claim 10, wherein the notification type is associated with a user-selected category of products or services.

18. The mobile device of claim 10, wherein the geographic region is associated with a home or work address of the user that is stored in contacts or an address book on the mobile device.

19. A non-transitory, computer-readable storage medium having instructions stored therein, that when executed by one or more processors, cause the one or more processors to perform operations comprising:

receiving a first input selecting a category from a plurality of category options, the category options defining different types of points of interest;

receiving a second input selecting one or more subcategories from a plurality of subcategory options, the subcategory options being different types of products or services associated with the category selected by the first input;

discovering a particular point of interest from a map database that falls within the category selected by the first input;

detecting that the mobile device has entered or exited a geofence surrounding a geographic region including the particular point of interest;

determining, by the one or more sensors, a current context of the mobile device, the current context being that a user of the mobile device is walking or driving with the mobile device and a direction of travel of the user;

determining whether or not to present a notification on the mobile device based on the current context;

responsive to determining to present the notification on the mobile device, determining a user-selected notification type based on the subcategory selected by the second input; and presenting the notification of the user-selected notification type on the mobile device.

20. The non-transitory, computer-readable storage medium of claim 19, wherein the detecting includes determining that a dwell time within the geofence has been exceeded.

* * * * *